US010576609B2

(12) United States Patent
Umetsu et al.

(10) Patent No.: US 10,576,609 B2
(45) Date of Patent: Mar. 3, 2020

(54) MANUFACTURING METHOD OF HONEYCOMB STRUCTURE, AND GRINDING WHEEL

(71) Applicant: NGK INSULATORS, LTD., Nagoya (JP)

(72) Inventors: Nobuyuki Umetsu, Nagoya (JP); Toshihiro Fukui, Nagoya (JP); Nobuchika Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 411 days.

(21) Appl. No.: 15/047,969

(22) Filed: Feb. 19, 2016

(65) Prior Publication Data
US 2016/0263728 A1    Sep. 15, 2016

(30) Foreign Application Priority Data

Mar. 13, 2015    (JP) .................................. 2015-050540

(51) Int. Cl.
*B24B 19/22*    (2006.01)
*B24D 5/14*    (2006.01)
(Continued)

(52) U.S. Cl.
CPC .................. *B24D 5/14* (2013.01); *B24B 7/17* (2013.01); *B24B 27/0076* (2013.01); *B24D 7/14* (2013.01);
(Continued)

(58) Field of Classification Search
CPC .............. B24D 5/14; B24B 19/22; B24B 7/22
(Continued)

(56) References Cited

U.S. PATENT DOCUMENTS 3,537,216 A * 11/1970 Borgh ....................... B24B 1/00
451/58
3,802,130 A * 4/1974 Lindenbeck ............. B24D 5/14
451/544
(Continued)

FOREIGN PATENT DOCUMENTS

JP    52-121890 A1    10/1977
JP    63-174877 A1    7/1988
(Continued)

OTHER PUBLICATIONS

Extended European Search Report (Application No. 16158502.1) dated Aug. 29, 2016.
(Continued)

*Primary Examiner* — Robert A Rose
(74) *Attorney, Agent, or Firm* — Burr & Brown, PLLC (57) ABSTRACT

A manufacturing method of the honeycomb structure uses a grinding wheel having a coarse abrasive grain layer and a pair of fine abrasive grain layers sintered and secured to be formed on both sides of the coarse abrasive grain layer, and has a grinding wheel rotating step of rotating the pair of grinding wheels disposed via a predetermined space in a state where fine abrasive grain layers of the grinding wheels face each other; a conveying step of conveying a honeycomb formed body formed by extrusion and the like; an end face grinding step of grinding end faces of the conveyed honeycomb formed body with the rotating grinding wheels; and a firing step of firing the honeycomb formed body.

10 Claims, 4 Drawing Sheets

(51) Int. Cl.
  *B24B 27/00* (2006.01)
  *B28B 11/12* (2006.01)
  *B28B 11/04* (2006.01)
  *B24D 7/14* (2006.01)
  *B28B 11/24* (2006.01)
  *B32B 3/00* (2006.01)
  *B24B 7/17* (2006.01)
  *B32B 3/12* (2006.01)
  *C09D 1/00* (2006.01)
  B28B 3/20 (2006.01)
  B29C 48/11 (2019.01)
  B29C 48/00 (2019.01)

(52) U.S. Cl.
  CPC .............. *B28B 11/04* (2013.01); *B28B 11/12* (2013.01); *B28B 11/243* (2013.01); *B32B 3/00* (2013.01); *B32B 3/12* (2013.01); *C09D 1/00* (2013.01); *B28B 3/20* (2013.01); B28B 2003/203 (2013.01); B29C 48/0022 (2019.02); B29C 48/11 (2019.02)

(58) Field of Classification Search
  USPC ............ 451/41, 44, 57, 58, 61, 27, 544, 541
  See application file for complete search history.

(56) References Cited

U.S. PATENT DOCUMENTS

| | | | | |
|---|---|---|---|---|
| 4,338,748 A | * | 7/1982 | Elbel | B24D 7/14 451/461 |
| 5,063,714 A | * | 11/1991 | Meyer | B24D 7/14 451/541 |
| 2008/0268200 A1 | | 10/2008 | Domey et al. | |
| 2014/0087636 A1 | | 3/2014 | Fujioka et al. | |
| 2015/0052757 A1 | | 2/2015 | Okazaki | |

FOREIGN PATENT DOCUMENTS

| | | |
|---|---|---|
| JP | 01-175166 U | 12/1989 |
| JP | H07-246564 A1 | 9/1995 |
| JP | 2008-012786 A1 | 1/2008 |
| JP | 2010-525965 A1 | 7/2010 |
| JP | 2006-281039 A1 | 10/2016 |
| WO | WO2013/150919 A1 | 10/2013 |

OTHER PUBLICATIONS

Japanese Office Action (Application No. 2015-050540) dated Sep. 26, 2017 (with English translation).

* cited by examiner

MANUFACTURING METHOD OF HONEYCOMB STRUCTURE, AND GRINDING WHEEL

The present application is an application based on JP 2015-050540 filed on Mar. 13, 2015 with the Japan Patent Office, the entire contents of which are incorporated herein by reference.

BACKGROUND OF THE INVENTION

Field of the Invention

The present invention relates to a manufacturing method of a honeycomb structure, and a grinding wheel. More particularly, it relates to a manufacturing method of a honeycomb structure in which end faces of a honeycomb formed body formed by extrusion are ground to finish the end face, and a grinding wheel for use in the manufacturing method.

Description of the Related Art

Heretofore, a honeycomb structure made of ceramics (hereinafter simply referred to as "the honeycomb structure") has broadly been used in a use application such as a car exhaust gas purifying catalyst carrier, a diesel particular removing filter, or a heat reservoir for a burning device. The honeycomb structure is manufactured through a forming step of mixing and preparing a forming raw material (a kneaded material) and then extruding the material into a desirable honeycomb shape (e.g., a round pillar shape) through an extruder; a raw cutting step of rawly cutting an extruded honeycomb formed body into a predetermined length; a drying step of combining induction drying and hot air drying, and drying the honeycomb formed body; a finishing step of performing end face finishing of the dried honeycomb formed body; and a firing step of firing the honeycomb formed body at a high temperature.

In the raw cutting step, the longitudinal uncut honeycomb formed body extruded by the extruder is cut into the predetermined length by use of a cutting tool such as a fine metal wire. The honeycomb formed body immediately after extruded and before drying contains a lot of water, and is soft. Therefore, the honeycomb formed body can easily be cut by utilizing the metal wire or the like. However, when the honeycomb formed body comes in contact with the metal wire, the whole shape of the honeycomb formed body might be deformed, or a cut surface of the honeycomb formed body with the metal wire might be deformed (cells might mainly be deformed).

Therefore, after the drying step, the finishing step is carried out to perform end face finishing in which the end faces of the honeycomb formed body are processed, and cell deformation or the like caused by the above raw cutting step is removed.

In the case of a honeycomb structure having a large diameter (hereinafter referred to as "the large-size honeycomb structure"), in the above finishing step, there are performed a finish cutting step of passing both end portions of the honeycomb formed body subjected to the drying step through a space between a pair of cutters disposed away from each other to cut the end portions, and an end face grinding step of performing end face grinding of the end faces (cut surfaces) of the honeycomb formed body by use of a well-known cup type grinding wheel 100 (see FIG. 8) to remove chippings or feed marks generated in the end faces in the finish cutting step (e.g., see Patent Document 1). In the finish cutting step, when cut pieces of both the end portions removed from a main body of the honeycomb formed body are thin, there are possibilities that cutter blade edges escape to the outside to cause a perpendicularity defect and that the honeycomb formed body main body immediately after cut is damaged by the cutters. For the purpose of avoiding the above problems, it is necessary to set a cutting width of each end portion by the cutter to, e.g., at least 10 mm. On the other hand, an amount of the end face to be ground by the cup type grinding wheel (a grinding depth) is, for example, from about 1 to 2 mm. Consequently, there is formed the honeycomb formed body from which the deformation of the cells caused in the raw cutting step is removed, and the honeycomb formed body is sent to the subsequent firing step. For the large-size honeycomb structure, after the firing step, a circumferential surface of the honeycomb structure is ground and processed in a circumference grinding step to remove the deformation of the whole shape of the honeycomb formed body which is caused in the raw cutting step, and a circumferential wall is formed in a circumference coating step. On the other hand, in the case of a honeycomb structure for use as the car exhaust gas purifying catalyst carrier (hereinafter referred to as "the car exhaust honeycomb structure"), the above finish cutting step is only performed. Therefore, for the car exhaust honeycomb structure, in the finish cutting step, it is necessary to also remove the deformation of the whole shape of the honeycomb formed body which is caused in the raw cutting step.

[Patent Document 1] JP-A-2008-12786

SUMMARY OF THE INVENTION

As described above, in a finishing step, it is necessary to perform two steps of a finish cutting step of cutting both end portions of a honeycomb formed body and an end face grinding step of performing end face grinding of cut end faces (in the case of a large-size honeycomb structure), or it is necessary to only perform the finish cutting step (in the case of a car exhaust honeycomb structure). Especially, in manufacturing of the large-size honeycomb structure in which both the finish cutting step and the end face grinding step are performed, a lot of time is required for each step, and there is also caused a factor to disturb efficient manufacturing of the honeycomb structure.

Furthermore, to perform the finish cutting step, an accuracy to correctly position the honeycomb formed body between a pair of cutters has been required. In a case where this positioning accuracy is insufficient, there might occur the problem of a perpendicularity defect of the end faces of the honeycomb formed body to its side surface. Therefore, in the finish cutting step, an adjustment allowance of the positioning to suitably finish the perpendicularity is also required.

However, removing of both the end portions of the dried honeycomb formed body is determined on the basis of any large value in a length of deformation of the whole shape of the honeycomb formed body which is caused in a raw cutting step, a depth of deformation of cells from each end face of the honeycomb formed body, and a perpendicularity adjustment amount of the cells of the honeycomb formed body. One example will be described. In the case of the car exhaust honeycomb structure, the length of the deformation of the whole shape of the honeycomb formed body is about 5 mm, when a thickness of partition walls is comparatively large and a dimensional accuracy is not based on conditions which are not strict. It is to be noted that in the case of the large-size honeycomb structure, circumference grinding is performed in the subsequent step, and hence there is not any special restriction on the length of the deformation of the whole shape of the honeycomb formed body. Furthermore, the depth of the deformation of the cells by raw cutting is about 5 mm in the car exhaust honeycomb structure, and the depth is about 3 mm in the large-size honeycomb structure whose partition walls are thicker than those of the car exhaust honeycomb structure. Additionally, the perpendicularity adjustment allowance is about 1 mm in the car exhaust honeycomb structure, and about 6 mm at maximum in the large-size honeycomb structure.

When both the end portions of the dried honeycomb formed body are removed as much as about 6 mm, the deformation caused in the raw cutting step can be removed. On the other hand, when a cutting allowance during finish cutting is small, a reaction force from a cutting removal side to the cutter decreases, and blade edges of the above pair of cutters escape to the outside to open in a "truncated chevron" shape. As a result, the perpendicularity defect might be generated in the cut honeycomb formed body. Additionally, immediately after the cutting, the cutters opened in the "truncated chevron" shape return to their original shape, and hence, the cutters might come in contact with the cut honeycomb formed body to cause damage to the honeycomb formed body. To avoid these disadvantages, the cutting allowance is set to 10 mm or more. When the finish cutting is replaced with the end face grinding, a removing amount can be decreased, and the finish cutting step can be omitted in the case of the large-size honeycomb structure. To realize the above step, a grinding wheel having an end face grinding ability of at least 6 mm is required in the end face grinding step.

A conventional cup type grinding wheel 100 (see FIG. 8) for use in the end face grinding has a grinding wheel substrate 101 in the form of a cup whose central portion is dented, and has, on a substrate end face 102 at an edge of the grinding wheel substrate 101 (corresponding to the edge of the cup), an abrasive grain layer 103 in which cemented diamond abrasive grains and the like are mixed with a sintering agent to be sintered and secured. Here, a limit value of a grinding amount (a grinding depth) of the cup type grinding wheel 100 depends on a height H of the abrasive grain layer 103 from the substrate end face 102 and is usually about 5 mm.

Figure 8:
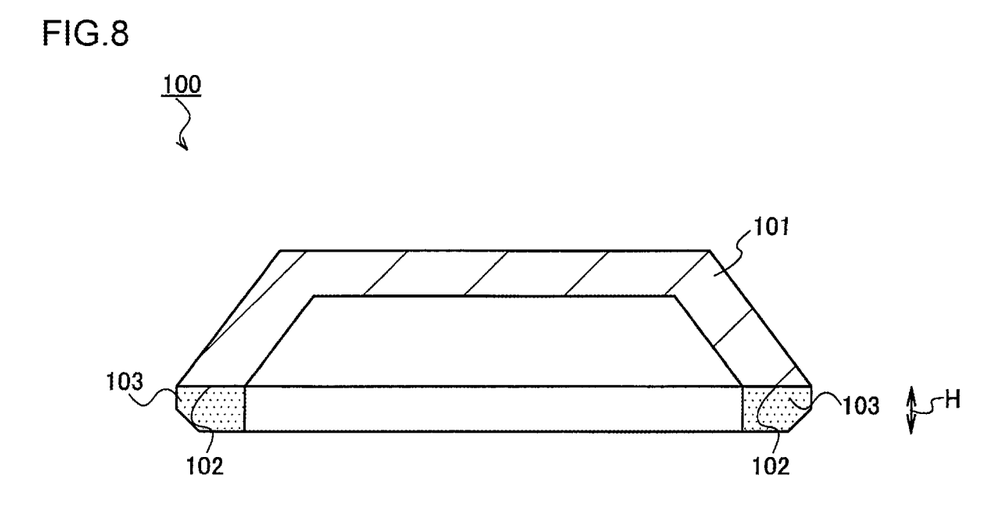
FIG. 8 is a schematic cross-sectional view showing one example of the conventional cup type grinding wheel.

When the height H of the abrasive grain layer 103 from the substrate end face 102 is set to the above limit value or more, a processing load during the contact of the honeycomb formed body with the abrasive grain layer 103 increases, and a deviation is easy to occur in rotation of the rotatable cup type grinding wheel 100. Therefore, there is the possibility that it is difficult to suitably grind the end faces. Furthermore, it is difficult to form the abrasive grain layer 103 at the height of the above limit value or more from the substrate end face 102 by itself, and there is the possibility that the abrasive grain layer 103 falls off from the substrate end face 102 due to the above processing load in the middle of grind processing. As a result, the grind processing might not stably be performed. That is, due to a limit by the grinding amount, deterioration of a processing accuracy and difficulty in forming the abrasive grain layer 103, the end face grinding of the grinding amount in excess of 5 mm cannot be performed by using the conventional cup type grinding wheel 100.

Therefore, in the large-size honeycomb structure and the car exhaust honeycomb structure, it is difficult to finish the rawly cut honeycomb formed body only by the end face grinding step. Furthermore, in the case of the large-size honeycomb structure, a cutting step of roughly cutting both the end portions cannot be omitted, and in the case of the car exhaust honeycomb structure, the end face grinding step cannot be performed in place of the cutting step.

Thus, the present invention has been developed in view of the above conventional situations, and objects thereof are to provide a manufacturing method of a honeycomb structure in which a cutting step of a honeycomb formed body in finishing steps can be omitted or replaced, and end faces of the honeycomb formed body can be finished only by an end face grinding step, and to provide a grinding wheel for use in the manufacturing method.

According to the present invention, a manufacturing method of a honeycomb structure and a grinding wheel are provided to achieve the above objects.

According to a first aspect of the present invention, a manufacturing method of a honeycomb structure which uses a grinding wheel having a grinding wheel substrate in the form of a disc is provided, a coarse abrasive grain layer sintered and secured to be formed on a circumferential surface of the grinding wheel substrate, and a fine abrasive grain layer which is extended from a coarse layer surface of the coarse abrasive grain layer along a direction orthogonal to a disc surface of the grinding wheel substrate and which is sintered and secured to be formed on the coarse abrasive grain layer by use of fine abrasive grains having grain diameters smaller than those of coarse abrasive grains constituting the coarse abrasive grain layer, the manufacturing method including a grinding wheel rotating step of rotating the pair of grinding wheels disposed via a predetermined space in a state where the fine abrasive grain layers of the grinding wheels face each other, in accordance with a rotation axis; a conveying step of conveying a honeycomb formed body to the space between the pair of grinding wheels along a direction orthogonal to a central axis direction of the honeycomb formed body, the honeycomb formed body being made of a forming raw material, having partition walls defining a plurality of cells which extend from one end face to the other end face and which become through channels for a fluid and being formed by extrusion, cutting and drying; an end face grinding step of performing end face grinding of the end faces of the conveyed honeycomb formed body with the rotating grinding wheels; and a firing step of firing the honeycomb formed body subjected to the end face grinding.

According to a second aspect of the present invention, the manufacturing method of the honeycomb structure according to the above first aspect is provided, which further includes a circumference grinding step of grinding and processing a circumferential portion of the honeycomb structure fired by the firing step; and a circumferential wall forming step of applying a circumference coating material to the circumferential portion of the ground and processed honeycomb structure to dry the honeycomb structure.

According to a third aspect of the present invention, the manufacturing method of the honeycomb structure according to the above first or second aspects is provided, wherein in the end face grinding step, the end face of the honeycomb formed body is subjected to the end face grinding as much as at least 6 mm.

According to a fourth aspect of the present invention, the manufacturing method of the honeycomb structure according to any one of the above first to third aspects is provided, wherein the coarse abrasive grain layer is formed to be thicker than the grinding wheel substrate.

According, to a fifth aspect of the present invention, the manufacturing method of the honeycomb structure according to any one of the above first to fourth aspects is provided, wherein the fine abrasive grain layers are sintered and secured to be formed on the pair of coarse layer surfaces of the coarse abrasive grain layer which face each other, respectively.

According to a sixth aspect of the present invention, the manufacturing method of the honeycomb structure according to any one of the above first to fifth aspects is provided, wherein the fine abrasive grain layer has an inclined portion including an inclined surface inclined from an outer end of the coarse layer surface of the coarse abrasive grain layer to the side of the rotation axis of the grinding wheel.

According to a seventh aspect of the present invention, the manufacturing method of the honeycomb structure according to the above sixth aspect is provided, wherein an angle to be formed between the inclined surface of the inclined portion and a virtual extension line along which a fine layer surface of the fine abrasive grain layer is extended is set to a range of 15° to 30°.

According to an eighth aspect of the present invention, a grinding wheel including a grinding wheel substrate in the form of a disc is provided; a coarse abrasive grain layer sintered and secured to be formed on a circumferential surface of the grinding wheel substrate; and a fine abrasive grain layer which is extended from a coarse layer surface of the coarse abrasive grain layer along a direction orthogonal to a disc surface of the grinding wheel substrate and which is sintered and secured to be formed on the coarse abrasive grain layer by use of fine abrasive grains having grain diameters smaller than those of coarse abrasive grains constituting the coarse abrasive grain layer.

According to a ninth aspect of the present invention, the grinding wheel according to the above eighth aspect is provided, wherein a thickness of the coarse abrasive grain layer is adjusted to be larger than a substrate thickness of the grinding wheel substrate.

According to a tenth aspect of the present invention, the grinding wheel according to the above eighth or ninth aspects is provided, wherein the fine abrasive grain layers are sintered and secured to the pair of coarse layer surfaces of the coarse abrasive grain layer which face each other, respectively.

According to an eleventh aspect of the present invention, the grinding wheel according to any one of the above eighth to tenth aspects is provided, wherein the fine abrasive grain layer further has an inclined portion including an inclined surface inclined from an outer end of the coarse layer surface of the coarse abrasive grain layer to the side of a rotation axis of the grinding wheel.

According to a twelfth aspect of the present invention, the grinding wheel according to the above eleventh aspect is provided, wherein an angle to be formed between the inclined surface of the inclined portion and a virtual extension line along which a fine layer surface of the fine abrasive grain layer is extended is set to a range of 15° to 30°.

According to the manufacturing method of the honeycomb structure of the present invention, there is provided a manufacturing method of a honeycomb structure in which a cutting step of a honeycomb formed body in finishing steps can be omitted or replaced, and end faces of the honeycomb formed body can be finished only by an end face grinding step.

According to a grinding wheel of the present invention, in addition to an effect by the above manufacturing method of the honeycomb structure, the grinding wheel is constituted so that respective coarse layer surfaces of a coarse abrasive grain layer are sandwiched between a pair of fine abrasive grain layers, thereby changing an attaching direction, so that a new honeycomb formed body can be ground and processed without replacing the grinding wheel itself and reduction of preparation cost of the grinding wheel can be achieved.

DESCRIPTION OF THE PREFERRED EMBODIMENTS

Hereinafter, a manufacturing method of a honeycomb structure of one embodiment of the present invention, and a grinding wheel will be described in detail with reference to the drawings. It is to be noted that the manufacturing method of the honeycomb structure of the present invention and the grinding wheel are not limited to the following embodiments, and various design changes, modifications, improvements and the like can be added without departing from the gist of the present invention.

A manufacturing method 1 of a honeycomb structure of one embodiment of the present invention uses a grinding wheel 10 mainly shown in FIG. 1 to FIG. 4, and mainly includes a grinding wheel rotating step of rotating the pair of grinding wheels 10 disposed via a predetermined space in a state where fine abrasive grain layers 11a (or fine abrasive grain layers 11b, details will be described later) of the grinding wheels face each other, in accordance with a rotation axis D; a conveying step of conveying a honeycomb formed body 20 to the space between the pair of grinding wheels 10 along a conveying direction C (see FIG. 3) orthogonal to a central axis direction B of the honeycomb formed body 20, the honeycomb formed body 20 being made of a forming raw material, having partition walls defining a plurality of cells which extend from one end face 21a to the other end face 21b and which become through channels for a fluid and being formed through respective steps of extrusion, raw cutting and drying; an end face grinding step of performing end face grinding to grind the end faces 21a and 21b of the conveyed honeycomb formed body 20 with the rotating grinding wheels 10; and a firing step of firing the honeycomb formed body 20 subjected to the end face grinding. Furthermore, the manufacturing method 1 of the honeycomb structure of the present embodiment may further include a circumference grinding step of grinding and processing a circumferential portion of the fired honeycomb structure; and a circumferential wall forming step of applying a circumference coating material to the circumferential portion of the ground and processed honeycomb structure to dry the honeycomb structure.

The manufacturing method 1 of the honeycomb structure is performed by utilizing an end face grinding device (not shown) for use in a conventional finishing step and a conveying device (not shown) which conveys the honeycomb formed body 20 to the end face grinding device. While utilizing equipment such as the existing end face grinding device, the grinding wheels 10 to be attached to the end face grinding device are novel, and hence, an upper limit value of a grinding amount (a grinding depth) of the grinding wheel 10 can be increased. Furthermore, a cutting step of cutting both end portions of the honeycomb formed body 20 can be omitted or replaced with the end face grinding step.

The grinding wheel 10 of the present embodiment has a grinding wheel substrate 12 in the form of a disc made of aluminum, a coarse abrasive grain layer 13 sintered and secured to be formed on the grinding wheel substrate 12, and a pair of fine abrasive grain layers 11a and 11b which is sintered and secured to be formed to sandwich the coarse abrasive grain layer 13 from both directions. That is, for the grinding wheel substrate 12, there are disposed two types of abrasive grain layers 13 and 11a and 11b in which two types of abrasive grains having different grain diameters are used.

The grinding wheel substrate 12 is a member in the form of the disc formed at a predetermined thickness H1 of the grinding wheel substrate, and at a position slightly away from the rotation axis D, 16 through hole portions 14a and 14b in total extending through a substrate upper surface 12a and a substrate bottom surface 12b are pierced at equal intervals.

Eight through hole portions 14a arranged at an interval of 45° around the rotation axis D are set so that an open hole diameter on a substrate bottom surface 12b side is smaller than an open hole diameter on a substrate upper surface 12a side, and in the grinding wheel substrate 12, a stepped portion is disposed in which the open hole diameter varies. On the other hand, eight through hole portions 14b each disposed at a position shifting as much as 22.5° from each through hole portion 14a around the rotation axis D are set so that the open hole diameter on the substrate upper surface 12a side is smaller than the open hole diameter on the substrate bottom surface 12b side, and in the grinding wheel substrate 12, a stepped portion is disposed in which the open hole diameter varies.

In consequence, a fixing bolt (not shown) is inserted from the substrate upper surface 12a side into the through hole portion 14a, and passes through the substrate bottom surface 12b to be screwed into an attaching portion (not shown) of the end face grinding device, so that a bolt head portion of the fixing bolt does not project from the substrate upper surface 12a, but the grinding wheel 10 of the present embodiment can firmly be fixed to the end face grinding device. Consequently, when the honeycomb formed body 20 is ground, the above fixing bolt does not disturb the conveying of the honeycomb formed body 20. Furthermore, also in a case where the substrate upper surface 12a and the substrate bottom surface 12b of the grinding wheel 10 are inverted to be screwed into the end face grinding device, the fixing bolt similarly does not disturb the conveying of the honeycomb formed body 20.

The coarse abrasive grain layer 13 is formed along a disc surface 15 of the grinding wheel substrate 12 to cover the disc surface 15, and its cross section is substantially rectangular and possesses an annular shape as a whole. The coarse abrasive grain layer 13 is formed by sintering and securing a mixture obtained by mixing well-known abrasive grains and bonding agent at predetermined ratios in the same manner as in the conventional cup type grinding wheel 100 (see FIG. 8). That is, such a mixture is applied at a predetermined thickness to the disc surface 15 of the grinding wheel substrate 12, and an applied shape is further adjusted, followed by sintering at a high temperature, so that the coarse abrasive grain layer 13 firmly bonded to the disc surface 15 is formed.

There is not any special restriction on types of abrasive grains and bonding agent which form the coarse abrasive grain layer 13, and heretofore used types can optionally be selected and used. For example, as the abrasive grains, cemented diamond abrasive grains, CBN (cubic boron nitride) abrasive grains or the like are usable. On the other hand, as the bonding agent, a resin bond, a metal bond, a resin-metal bond obtained by mixing these bonds at predetermined ratios, a vitrified bond or the like is usable.

In the grinding wheel 10 of the present embodiment, for the coarse abrasive grain layer 13 and the fine abrasive grain layers 11a and 11b which will be described later, the diamond abrasive grains are selected as the abrasive grains, and there are used the diamond abrasive grains sintered and secured by using the bonding agent made of the resin-metal bond. Additionally, there are used the abrasive grains in the coarse abrasive grain layer which have grain diameters larger than grain diameters of abrasive grains for use in the fine abrasive grain layers 11a and 11b which will be described later. Therefore, in the coarse abrasive grain layer 13, ground surfaces of the honeycomb formed body 20 are roughly cut, but the grinding amount can be increased by one-time contact with the honeycomb formed body 20.

Figure 4:
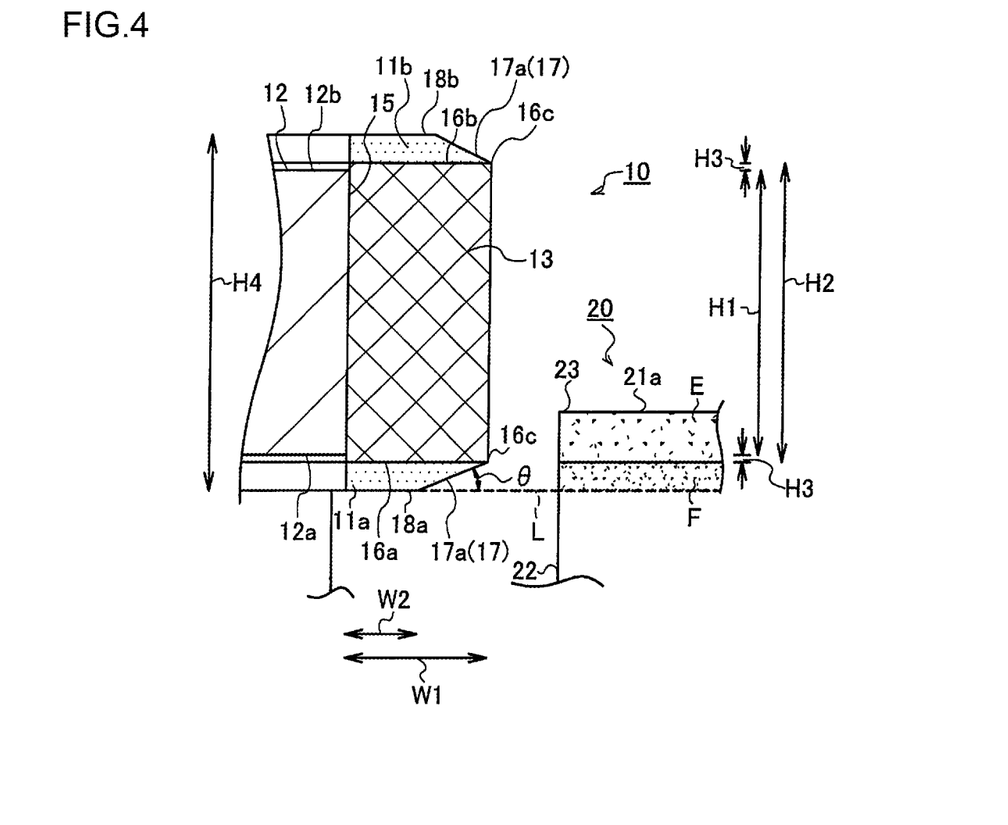
FIG. 4 is an explanatory view schematically showing a positional relation between the grinding wheel and a honeycomb formed body.

Furthermore, when the coarse abrasive grain layer 13 is sintered and secured to the disc surface 15 of the grinding wheel substrate 12, the coarse abrasive grain layer is formed so that a height H2 of the coarse abrasive grain layer 13 is larger than the thickness H1 of the grinding wheel substrate (which corresponds to a length from the substrate upper surface 12a to the substrate bottom surface 12b, see FIG. 4). As a result, to the substrate upper surface 12a and the substrate bottom surface 12b of the grinding wheel substrate 12, one coarse layer surface 16a and another coarse layer surface 16b of the coarse abrasive grain layer 13 project upward or downward, respectively. In the grinding wheel 10 of the present embodiment, a height of each projected portion, i.e., a height H3 from the substrate upper surface 12a (or the substrate bottom surface 12b) of the grinding wheel substrate 12 is set to about 5 mm.

Figure 1:
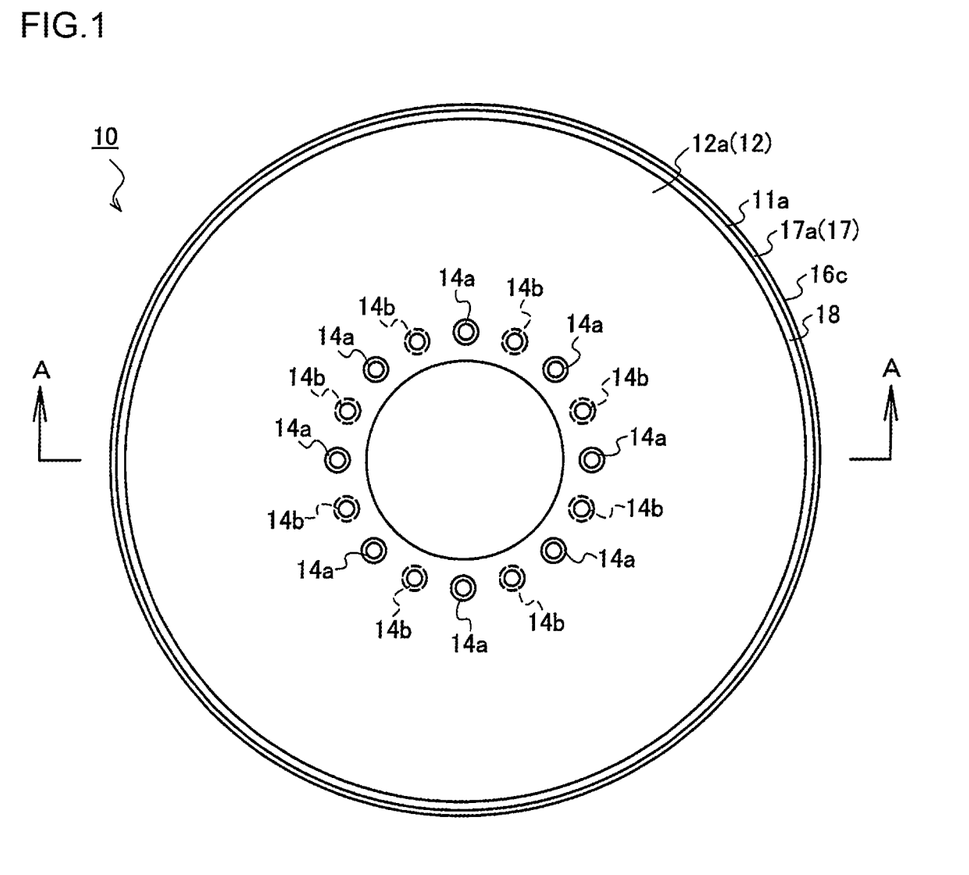
FIG. 1 is a plan view showing a schematic constitution of a grinding wheel of the present embodiment.
Figure 2:
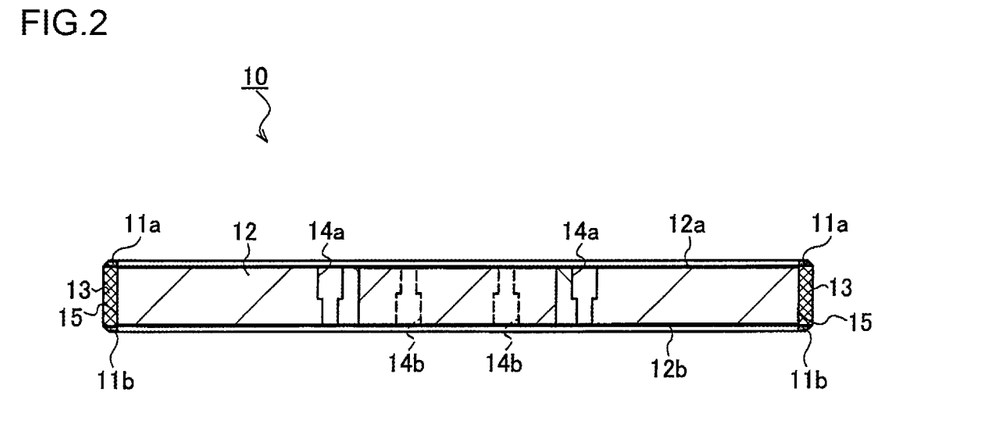
FIG. 2 is a cross-sectional view taken along the A-A line in FIG. 1 showing the schematic constitution of the grinding wheel.

After the coarse abrasive grain layer 13 is formed, the fine abrasive grain layers 11a and 11b are extended to the one coarse layer surface 16a and the other coarse layer surface 16b of the coarse abrasive grain layer 13, respectively, in a rotation axis direction of the grinding wheel 10 (corresponding to a paper surface upward-downward direction in FIG. 2). It is to be noted that the fine abrasive grain layers 11a and 11b are formed by the same technique as in the coarse abrasive grain layer 13, and sintered and secured to be formed on the respective coarse layer surfaces 16a and 16b by use of the abrasive grains and the bonding agent.

The grain diameters of the abrasive grains for use in the fine abrasive grain layers 11a and 11b are smaller than the grain diameters of the abrasive grains for use in the coarse abrasive grain layer 13 mentioned above. Therefore, with the fine abrasive grain layers 11a and 11b, an amount of the honeycomb formed body 20 to be cut off by the one-time contact is small, but the ground surfaces can be smoothened.

Furthermore, the fine abrasive grain layers 11a and 11b have inclined portions 17 including inclined surfaces 17a inclined from outer edges 16c of the coarse layer surfaces 16a and 16b of the coarse abrasive grain layer 13 to a rotation axis D side of the grinding wheel 10. An angle θ to be formed between the inclined surface 17a of the inclined portion 17 and a virtual extension line L along which a fine layer surface 18a or 18b of the fine abrasive grain layer 11a or 11b is extended in a disc surface direction of the grinding wheel 10 is set to a range of 15° to 30° and further preferably a range of 17° to 27°. Here, a width W2 of the fine layer surface is smaller than a grinding wheel width W1 of the grinding wheel 10.

When the angle θ to be formed is larger than 30°, a processing load between the grinding wheel and the honeycomb formed body 20 of a grinding object increases. On the other hand, when the angle is smaller than 15°, a distance of the inclined surface 17a of the inclined portion 17 lengthens, and a lot of time might be required to process the honeycomb formed body 20 up to its final length. Therefore, the angle θ to be formed is set to the above range.

The fine abrasive grain layers 11a and 11b substantially have a trapezoidal cross section inclined to the rotation axis D side, on their disc surface sides, and possess an annular shape as a whole (see FIG. 4). It is to be noted that in the present embodiment, the fine abrasive grain layers 11a and 11b of the same shape are shown, but the present invention is not limited to this embodiment. For example, the inclined surfaces 17a of the inclined portions 17 may be formed at different angles θ to be formed, or layer thicknesses of the fine abrasive grain layers 11a and 11b from the coarse layer surfaces 16a and 16b may be varied.

Figure 3:
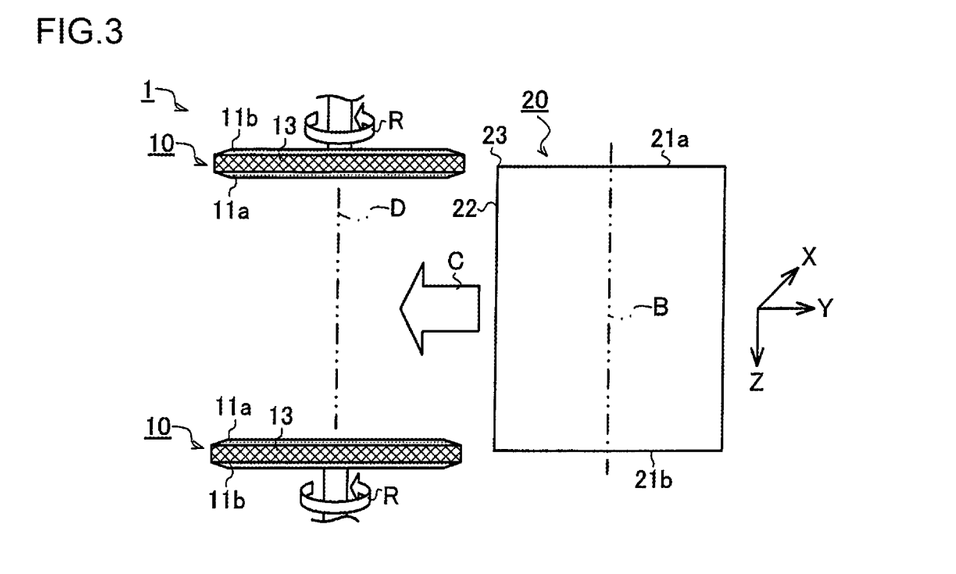
FIG. 3 is an explanatory view showing one example of a manufacturing method of a honeycomb structure of the present embodiment.

The end face grinding of the honeycomb formed body 20 is performed by using the grinding wheel 10 of the above constitution. As schematically shown in FIG. 3, the honeycomb formed body 20 subjected to the respective steps of extrusion, raw cutting and drying and sent to a finishing step is conveyed along a direction (the conveying direction C) orthogonal to the central axis direction B of the honeycomb formed body 20.

In the end face grinding device of a conveying destination, a pair of grinding wheels 10 are disposed away as much as a space corresponding to the length of the honeycomb formed body 20 in a state where the fine abrasive grain layers 11a and 11a of the grinding wheels face each other. The grinding wheels 10 attached to the end face grinding device rotate with synchronized rotation numbers in predetermined rotating directions R around the rotation axis D. The honeycomb formed body 20 is conveyed to the space between the pair of rotating grinding wheels 10.

The honeycomb formed body 20 brought close to the rotating grinding wheels 10 first comes in contact with the coarse abrasive grain layers 13 of the grinding wheels 10 which are disposed at the outermost positions. Further specifically, a circumferential portion 22 of the honeycomb formed body 20 which includes corner portions 23 comes in contact. Here, the coarse abrasive grain layers 13 are formed by using the abrasive grains having large grain diameters, and hence, in association with the conveying of the honeycomb formed body 20, the one end face 21a can be ground by increasing the grinding amount in the one-time contact.

In FIG. 4, a portion shown by a hatching region E is a portion to be ground by the coarse abrasive grain layer 13. Consequently, the same effect as in the rough cutting in which cutters are utilized can substantially be produced. However, the abrasive grains having comparatively large grain diameters are used, and hence, the ground surface is in a rough state.

When the honeycomb formed body 20 further continues to be conveyed in this state, a part of the circumferential portion 22 of the honeycomb formed body 20 comes in contact with the fine abrasive grain layer 11a having the inclined portion 17. Consequently, a portion (a hatching region F) under the hatching region E which is cut off by the coarse abrasive grain layer 13 is ground by the fine abrasive grain layer 11a formed by using the abrasive grains having small grain diameters. As a result, the end face 21a of the honeycomb formed body 20 becomes a smooth surface having a high flatness.

Consequently, the same effect as in the end face grinding in which the existing cup type grinding wheel 100 is used can be produced. Finally, the end face 21a of the honeycomb formed body 20 is ground up to a position matching the fine layer surface 18a of the fine abrasive grain layer 11a. It is to be noted that a similar treatment is also performed in the facing grinding wheel 10. As a result, the one end face 21a and the other end face 21b of the honeycomb formed body 20 can simultaneously be ground and processed.

In consequence, the coarse abrasive grain layer 13 and the fine abrasive grain layers 11a and 11b are disposed by using two types of abrasive grains having different grain diameters, respectively. First, rough grinding by the coarse abrasive grain layers 13, and then, fine grinding by the fine abrasive grain layers 11a and 11b is performed, so that the upper limit value of the grinding amount (the grinding depth) of the grinding wheel 10 can be increased. According to the grinding wheel 10 of the present embodiment, the end face grinding can be performed as much as at least 6 mm. As a result, an operation of rough cutting by use of a pair of conventional cutters can be omitted, and the end face finishing of the honeycomb formed body 20 can be performed only with the grinding wheel 10. In consequence, especially in the manufacturing of the large-size honeycomb structure, a process of cutting both the end portions can be omitted, and cost concerned with the formation of the honeycomb formed body 20 can be decreased.

Additionally, in the grinding wheel 10 of the present embodiment, the pair of fine abrasive grain layers 11a and 11b are formed to sandwich the coarse abrasive grain layer 13 from both sides of the coarse abrasive grain layer (the paper surface upward-downward direction in FIG. 2). Consequently, in a case where the finishing step to the honeycomb formed body 20 is continued and especially a grinding performance of the fine abrasive grain layer 11a deteriorates, a fixing direction of the grinding wheel 10 can be inverted, and hence, the grinding wheels can be fixed to the end face grinding device so that the other fine abrasive grain layers 11b of the grinding wheels face each other. In consequence, the grinding performance of the grinding wheel 10 can be restored, and the finishing step to the end faces 21a and 21b and the like can suitably be performed. That is, cost required for the grinding wheels 10 can be decreased.

Afterward, the honeycomb formed body whose finishing step is completed is fired to manufacture the honeycomb structure. It is to be noted that as required, the circumferential portion of the fired honeycomb structure is ground and processed, and a circumferential wall is formed on the circumferential portion, so that a circumference coating honeycomb structure can be obtained.

EXAMPLES

Hereinafter, a manufacturing method of a honeycomb structure of the present invention and a grinding wheel will be described on the basis of the following examples, but the manufacturing method of the honeycomb structure of the present invention and the grinding wheel are not limited to these examples.

(1) Comparison of Processing Loads

The grinding wheel of the present embodiment and a cup type grinding wheel (see FIG. 8) were used, respectively, and processing loads during grind processing of a honeycomb formed body were measured and compared, respectively. Additionally, there will be described results of the comparison of cases where grinding depths from end faces of the honeycomb formed bodies were set to 2 mm, 5 mm, and 7 mm, respectively. Here, a direction orthogonal to a conveying direction C on a lower side was defined as an X-axis, an opposite direction to the conveying direction C was defined as a Y-axis, a direction orthogonal to the conveying direction C (matching a central axis direction B of the honeycomb formed body) was defined as a Z-axis, and values (N) of the processing loads in the respective axis directions were measured (see FIG. 3).

Figure 5:
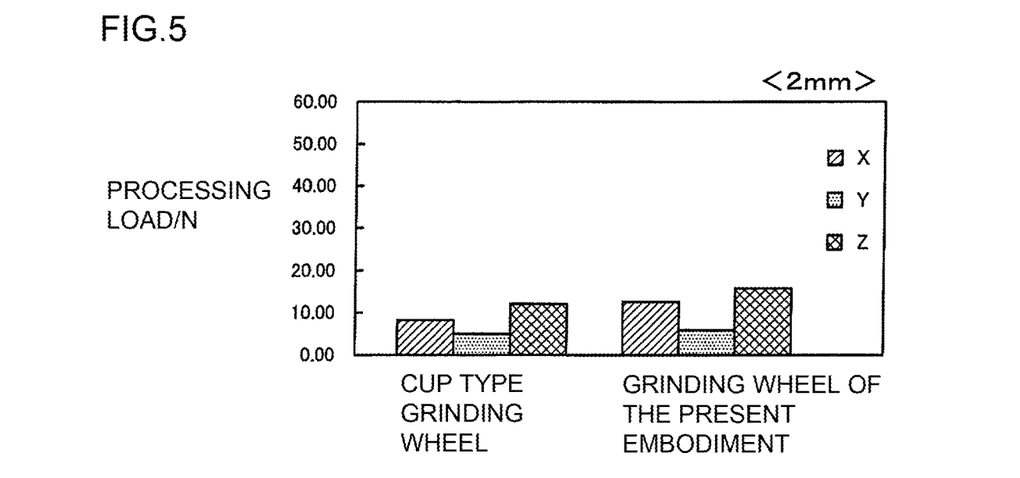
FIG. 5 is a graph showing comparison of values of processing loads to be applied in an X-axis direction, a Y-axis direction and a Z-axis direction, respectively, in a case where a conventional cup type grinding wheel and the grinding wheel of the present embodiment are used and a grinding depth is 2 mm.
Figure 6:
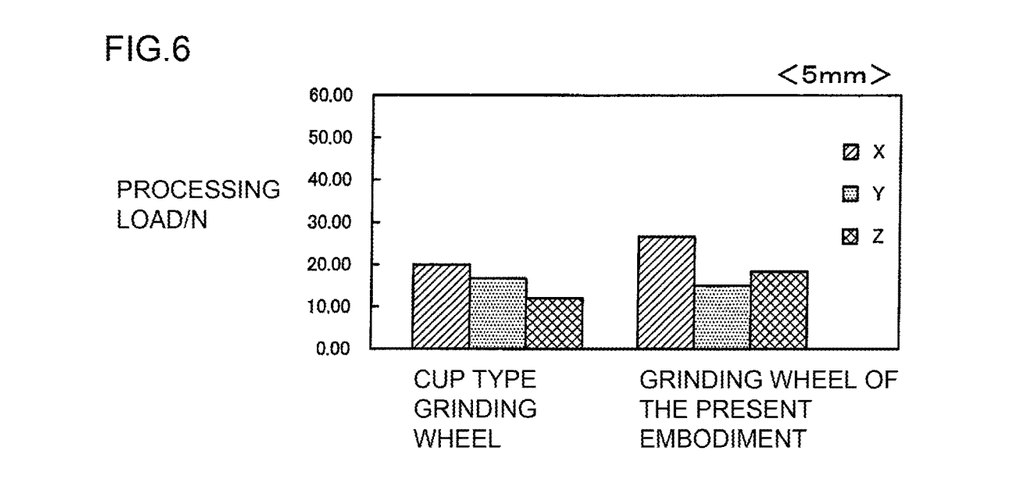
FIG. 6 is a graph showing comparison of values of the processing loads to be applied in the X-axis direction, the Y-axis direction and the Z-axis direction, respectively, in a case where the conventional cup type grinding wheel and the grinding wheel of the present embodiment are used and the grinding depth is 5 mm.

According to this measurement, in a case where the grinding depth was 2 mm (FIG. 5) and 5 mm (FIG. 6), a difference between the conventional cup type grinding wheel and the grinding wheel of the present embodiment was hardly recognized in the processing loads in the respective X-axis, Y-axis and Z-axis. That is, it has been confirmed that as long as the grinding depth is about 5 mm, the grinding wheel of the present embodiment substantially exerts equal performance.

Figure 7:
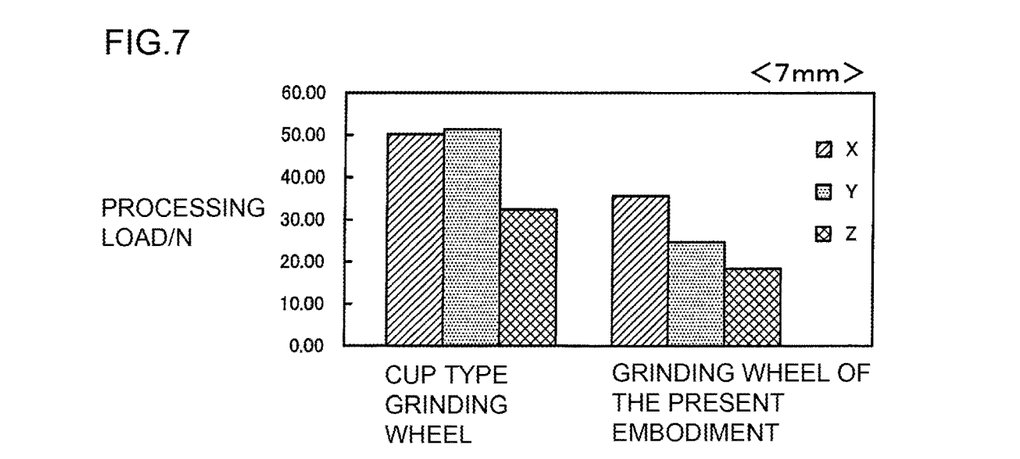
FIG. 7 is a graph showing comparison of values of the processing loads to be applied in the X-axis direction, the Y-axis direction and the Z-axis direction, respectively, in a case where the conventional cup type grinding wheel and the grinding wheel of the present embodiment are used and the grinding depth is 7 mm.

On the other hand, in a case where the grinding depth was 7 mm (FIG. 7), the values of the processing loads of the conventional cup type grinding wheel were large, whereas the values of the processing loads of the grinding wheel of the present embodiment were minimized. That is, as in the grinding wheel of the present embodiment, the coarse abrasive grain layer is disposed on a circumferential surface of a grinding substrate in the form of a disc, and fine abrasive grain layers using abrasive grains having different grain diameters are formed on coarse layer surfaces of the coarse abrasive grain layer. In this case, even when the grinding depth is large, e.g., 7 mm, the processing load can remarkably be decreased.

In consequence, even when the grinding depth is 7 mm, the end faces of the honeycomb formed body can stably be ground. In consequence, there decreases the possibility that defects such as lack of cells and chippings are generated in the end faces of the honeycomb formed body, and the honeycomb formed body can efficiently be formed.

(2) Grinding by Grinding Wheel

Table 1 mentioned below shows results of conditions and evaluations of end face grinding to grind end faces of each honeycomb formed body by using each of grinding wheels of Examples 1 to 3 and Comparative Examples 1 to 6.

TABLE 1

| | | | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Honeycomb body formed | Honeycomb dia. | mm | 300 | 100 | 300 | 300 | | 300 | | 100 | |
| | Honeycomb length | mm | 210 | 150 | 210 | 210 | | 210 | | 150 | |
| | Thickness of partition walls | mm(mil) | 0.11(4.5) | 0.15(6.0) | 0.08(3.15) | 0.11(4.5) | 0.15(6.0) | 0.11(4.5) | 0.15(6.0) | 0.08(3.15) | |
| | Cell density | cells/cm² (cpsi) | | | | | 62(400) | | | | |
| Grinding conditions | Processing speed | mm/s | 80 | 160 | | 80 | | | | 160 | |
| | Grinding wheel peripheral speed | m/s | | | | | 60 | | | | |
| Grinding grinding wheel | Grinding wheel type | | Hybrid type | | | Single type | | Cup type grinding wheel | | Single type | Cup type grinding wheel |
| | Angle θ to be formed | | 26.57° | 17.5° | 26.57° | | 26.3° | | 17.5° | 26.3° | |
| | Height (H4) of grinding wheel | mm | 25 | 21 | 25 | | 5 | | 21 | 5 | |
| | Grinding wheel width (W1) | mm | 10 | 12 | 10 | | 10 | | 12 | 10 | |
| | Height (H2) of coarse grain layer | mm | 21 | 19.1 | 21 | | 3 | | 19.1 | 3 | |
| | Width (W2) of fine layer surface | mm | 5 | 6 | 5 | | 6 | | | 6 | |
| | Outer dia. of grinding wheel | mm | 500 | 255 | 500 | | 500 | | 255 | | |
| | Count (fine grain layer) | # | 120 | 120 | 120 | | 120 | | 120 | | |
| | Count (coarse grain layer) | # | 80 | 80 | 120 | | 120 | | 120 | | |
| Evaluation | Chipping | Grinding amount 2 mm | Suitable | Suitable | Suitable | Suitable | Suitable | Suitable | Suitable | Suitable | Suitable |
| | | Grinding amount 5 mm | Suitable | Suitable | Suitable | Suitable | Suitable | Suitable | Suitable | Suitable | — |

TABLE 1-continued

|  |  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|---|
|  | Grinding amount 7 mm | Suitable | Suitable | Suitable | Defective | Defective | Non-processable | Non-processable | Suitable | — |
| Feed mark | Grinding amount 2 mm | Suitable | Suitable | Suitable | Suitable | Suitable | Suitable | Suitable | Suitable | Suitable |
|  | Grinding amount 5 mm | Suitable | Suitable | Suitable | Suitable | Suitable | Suitable | Suitable | Suitable | — |
|  | Grinding amount 7 mm | Suitable | Suitable | Suitable | Defective | Defective | Non-processable | Non-processable | Suitable | — |

(2-1) Honeycomb Formed Body and End Face Grinding Conditions

Upper stage positions of Table 1 mentioned above show data concerning a honeycomb diameter, a honeycomb length, a thickness of partition walls and a cell density of each honeycomb formed body as a work of a grinding object, and a processing speed and a grinding wheel peripheral speed of a grinding wheel. Additionally, intermediate stage positions of Table 1 mentioned above show data concerning a type of grinding wheel of each of Examples 1 to 3 and Comparative Examples 1 to 6 used in end face grinding, sizes of the grinding wheel (an angle θ to be formed by an inclined surface, a height H4 of the grinding wheel, a grinding wheel width W1, a height H2 of a coarse grain layer, a width W2 of a fine layer surface, and an outer diameter of the grinding wheel: see FIG. 4), and counts of abrasive grains of the fine grain layer and the coarse grain layer. Additionally, in the types of grinding wheels, "a hybrid type" indicates the grinding wheel in which grinding wheels of two types of counts (#120 and #80) of different grain diameters of the present invention are used, and "a single type" indicates the grinding wheel in which the grinding wheel of one type of count (#120) is used. Additionally, the cup type grinding wheel is a well-known type which has heretofore been used in the end face grinding.

(2-2) Evaluation Standards of End Face

The end face grinding of the honeycomb formed body was performed on the basis of end face grinding conditions of the above (2-1), and the end face of the honeycomb formed body subjected to the end face grind processing was visually confirmed. The grinding wheels were evaluated on the basis of presence/absence and lengths of "chippings" and "feed marks" of the end face subjected to the end face grind processing. To specifically describe evaluation standards, in a case where any "chippings" were not present in the end face (0 chipping) and the length of the feed mark was 35 μm or less, a quality of a mass producible level was recognized, and the grinding wheel was evaluated as "suitable". On the other hand, in a case where even one of the above two conditions was not satisfied, a level of a non-mass producible level was recognized, and the grinding wheel was evaluated as "defective".

(2-3) Evaluation Result of Grinding Wheel

Lower stage positions of Table 1 show results of end face grinding of the honeycomb formed bodies by use of the grinding wheels of Examples 1 to 3 and Comparative Examples 1 to 6 on the basis of the evaluation standards of the above (2-2). As to each grinding wheel, a grinding amount to the end face was varied in three stages (2 mm, 5 mm and 7 mm), and the chippings and feed marks in the respective grinding amounts were confirmed.

According to this evaluation, cases where the grinding wheels of Examples 1 to 3 were used were suitably evaluated in any of chippings and feed marks. Any differences were not recognized between the grinding wheel of the present embodiment and the conventional grinding wheel concerning a difference of a partition wall thickness of partition walls of each honeycomb formed body, differences of a honeycomb diameter and a honeycomb length, and a difference of an angle θ to be formed by an inclined surface of each grinding wheel. As a result, it has been found that the grinding wheel of the present invention is especially useful for the end face grinding of the honeycomb formed body.

On the other hand, in the cases of Comparative Example 1 and Comparative Example 2 (single type of grinding wheels were used), when a grinding amount was small, e.g., 2 mm and 5 mm, a suitable evaluation was obtained, but when the grinding amount was large, e.g., 7 mm, each comparative example was evaluated as defective in any of chippings and feed marks. These results indicated the same tendency as in the comparison of the processing loads in the above (1). That is, when the grinding amount increases, in the case of the single type of grinding wheel, it is presumed that the processing load is excessively large, and it is considered that the end face grinding cannot suitably be performed.

Furthermore, in the cases of Comparative Example 3 and Comparative Example 4 (cup type grinding wheels were used), similarly to Comparative Example 1 and Comparative Example 2, when a grinding amount was small, e.g., 2 mm and 5 mm, a suitable evaluation was obtained, but when the grinding amount was large, the amount was in excess of an abrasive grain portion dimension of the cup type grinding wheel, and hence processing of end face grinding itself was impossible.

On the other hand, as shown in Comparative Example 5, when a thickness of partition walls of a honeycomb formed body was small (0.08 mm/3.15 mil), suitable evaluations were obtained in chippings and feed marks. However, as the thickness of the partition walls increases, it is considered that end face grinding becomes defective, because the grinding wheel only includes an abrasive grain layer of one type of count (#120). Also in Comparative Example 6, the conventional cup type grinding wheel was used, and in this case, a limit of a grinding amount was 2 mm.

As described above, according to a manufacturing method of a honeycomb structure of the present invention, and a grinding wheel, a grinding amount can noticeably improve as compared with a conventional cup type grinding wheel. As a result, especially for a large-size honeycomb structure in which a cutting step after drying and an end face grinding step have heretofore been required, a finishing step can be performed only by the end face grinding step, and a manufacturing efficiency of the honeycomb structure can improve. Additionally, also for a car exhaust honeycomb structure in which a cutting step has heretofore only been performed, a grinding amount of a grinding wheel is increased, and hence, a finishing step can be performed only by an end face grinding step in place of the cutting step. It is to be noted that in a case where the grinding wheel is used in manufacturing of a car exhaust honeycomb structure, the grinding wheel is suitably used in the honeycomb structure in which partition walls are thick and a dimensional accuracy is not strictly required. In consequence, a finishing allowance by end face grinding can be suppressed to at least about 5 mm.

A manufacturing method of a honeycomb structure of the present invention and a grinding wheel can be used in formation of a honeycomb formed body to manufacture the honeycomb structure which can be utilized in a car exhaust gas purifying catalyst carrier, a diesel particular removing filter, a heat reservoir for a burning device or the like. Especially, the present invention is suitable for manufacturing of a large-size honeycomb structure. Additionally, the present invention can be applied to various honeycomb structures.

DESCRIPTION OF REFERENCE NUMERALS

1: manufacturing method of a honeycomb structure, 10: grinding wheel, 11a and 11b: fine abrasive grain layer, 12 and 101: grinding wheel substrate, 12a: substrate upper surface, 12b: substrate bottom surface, 13: coarse abrasive grain layer, 14a and 14b: through hole portion, 15: disc surface, 16a: one coarse layer surface, 16b: the other coarse layer surface, 16c: outer edge, 17: inclined portion, 17a: inclined surface, 18a and 18b: fine layer surface, 20: honeycomb formed body, 21a: one end face, 21b: the other end face, 22: circumferential portion, 23: corner portion, 100: cup type grinding wheel, 102: substrate end face, 103: abrasive grain layer, B: central axis direction, C: conveying direction, D: rotation axis, H1: thickness of the grinding wheel substrate, H2 and H: height of the abrasive grain layer, H3: height from the substrate upper surface (the substrate bottom surface), H4: height of the grinding wheel, L: virtual extension line, R: rotating direction, W1: grinding wheel width, W2: width of the fine layer surface, and θ: angle to be formed.

What is claimed is:

1. A manufacturing method of a honeycomb structure which uses a grinding wheel having a grinding wheel substrate in the form of a disc, a coarse abrasive grain layer sintered and secured to be formed on a circumferential surface of the grinding wheel substrate, and a fine abrasive grain layer which is extended from a coarse layer surface of the coarse abrasive grain layer along a direction orthogonal to a disc surface of the grinding wheel substrate and which is sintered and secured to be formed on the coarse abrasive grain layer by use of fine abrasive grains having grain diameters smaller than those of coarse abrasive grains constituting the coarse abrasive grain layer, the manufacturing method comprising:
   a grinding wheel rotating step of rotating a pair of grinding wheels disposed via a predetermined space in a state where the fine abrasive grain layers of the pair of grinding wheels face each other, in accordance with a rotation axis;
   a conveying step of conveying a honeycomb formed body to the space between the pair of grinding wheels along a direction orthogonal to a central axis direction of the honeycomb formed body, the honeycomb formed body being made of a forming raw material, having partition walls defining a plurality of cells which extend from one end face to the other end face and which become through channels for a fluid and being formed by extrusion, cutting and drying;
   an end face grinding step of performing end face grinding of the end faces of the conveyed honeycomb formed body with the rotating pair of grinding wheels; and
   a firing step of firing the honeycomb formed body subjected to the end face grinding;
   wherein in the end face grinding step, the end face of the honeycomb formed body is subjected to the end face grinding to a distance of at least 6 mm.

2. The manufacturing method of the honeycomb structure according to claim 1, which further comprises:
   a circumference grinding step of grinding and processing a circumferential portion of the honeycomb structure fired by the firing step; and
   a circumferential wall forming step of applying a circumference coating material to the circumferential portion of the ground and processed honeycomb structure to dry the honeycomb structure.

3. The manufacturing method of the honeycomb structure according to claim 1,
   wherein the coarse abrasive grain layer is formed to be thicker than the grinding wheel substrate.

4. The manufacturing method of the honeycomb structure according to claim 1,
   wherein the fine abrasive grain layers are sintered and secured to be formed on the coarse abrasive grain layer surfaces which face each other on the respective pair of grinding wheels.

5. The manufacturing method of the honeycomb structure according to claim 1,
   wherein the fine abrasive grain layer has an inclined portion comprising an inclined surface inclined from an outer end of the coarse layer surface of the coarse abrasive grain layer to the side of the rotation axis of the grinding wheel.

6. The manufacturing method of the honeycomb structure according to claim 5,
   wherein an angle to be formed between the inclined surface of the inclined portion and a virtual extension line along which a fine layer surface of the fine abrasive grain layer is extended is set to a range of 15° to 30°.

7. A grinding wheel comprising:
   a grinding wheel substrate in the form of a disc;
   a coarse abrasive grain layer sintered and secured to be formed on a circumferential surface of the grinding wheel substrate; and
   a fine abrasive grain layer which is extended from a coarse layer surface of the coarse abrasive grain layer along a direction orthogonal to a disc surface of the grinding wheel substrate and which is sintered and secured to be formed on the coarse abrasive grain layer by use of fine abrasive grains having grain diameters smaller than those of coarse abrasive grains constituting the coarse abrasive grain layer;

wherein a thickness of the coarse abrasive grain layer is adjusted to be larger than a substrate thickness of the grinding wheel substrate.

8. The grinding wheel according to claim 7,
wherein the fine abrasive grain layers are sintered and secured to the pair of coarse layer surfaces of the coarse abrasive grain layer which face each other, respectively.

9. The grinding wheel according to claim 7,
wherein the fine abrasive grain layer further has an inclined portion comprising an inclined surface inclined from an outer end of the coarse layer surface of the coarse abrasive grain layer to the side of a rotation axis of the grinding wheel.

10. The grinding wheel according to claim 9,
wherein an angle to be formed between the inclined surface of the inclined portion and a virtual extension line along which a fine layer surface of the fine abrasive grain layer is extended is set to a range of 15° to 30°.

* * * * *